UNITED STATES PATENT OFFICE.

ALFRED ARTHUR LOCKWOOD, OF LONDON, ENGLAND, ASSIGNOR TO MUREX MAGNETIC COMPANY, LIMITED, OF LONDON, ENGLAND.

PROCESS OF SEPARATING ORES, &c.

1,043,851.

No Drawing.

Specification of Letters Patent. Patented Nov. 12, 1912.

Application filed April 29, 1912. Serial No. 693,991.

*To all whom it may concern:*

Be it known that I, ALFRED ARTHUR LOCKWOOD, a subject of the King of Great Britain, residing at Baltic House, 27 Leadenhall street, in the city of London, England, have invented new and useful Improvements in Processes of Separating Ores, &c., of which the following is a specification.

This invention has for its object improvements in or relating to the separation of oxid, carbonate, sulfid or other ores or the like.

According to this invention ores whose metallic constituents consist wholly or partially of oxids or carbonates are easily and cheaply coated with magnetite to the exclusion of the gangue by means of an oily liquid in the presence of water by adding at some stage of the process a small quantity of a carbonate of an alkali metal either alone or in combination with the silicate of an alkali metal. While substantially any oily liquid can be employed, preferably the cheap hydrocarbon residuums such as Borneo residuum, Texas residuum, or tar, creosote, etc., are employed in practice.

Example I: 10,000 lbs. of a copper carbonate, copper silicate and copper glance ore in a quartzite gangue assaying 4.6% copper was suspended in an equal weight of water and gradually fed into a horizontal agitator provided with an outlet together with a paint composed of 150 lbs. of Texas residuum oil and 300 lbs. of magnetite; 31 lbs. of soda ash was added to the water.

Example II: An ore consisting of carbonate and silicate of copper in a quartzite and white slate gangue and assaying 7.3% copper was agitated for about one half hour with 1 oz. of soda ash and 100 lbs. of a 2.5° Baumé silicate of soda solution and a paint consisting of a mixture of 1.6 lbs. Texas residuum oil and 3.2 lbs. of magnetite. An extraction of 82% copper was obtained.

As magnetite is really an example of an oxidized ore (and is intended to be included in such term) this invention enables magnetite which has been previously wetted with water by the aid of a carbonate of an alkali metal in combination if desired with a silicate of an alkali metal to be easily incorporated with oil. Magnetite as recovered in present practice from the metalliferous particles to which it is attached is admixed with water and hitherto it has been necessary to evaporate the occluded water. It can now be incorporated with an oil as follows:

Example III: To the magnetite and water is added 1 oz. to 5 oz. of soda ash for every 100 lbs. of water. By adding oil and agitating a magnetic paint can be made.

In all these examples it is to be understood that the water employed is a neutral water.

Although it is usual to form the magnetic paint by mixing dry magnetite with oil and such has been described in the examples it follows from the result of Example III that when treating an ore, whether sulfid or other, it is not necessary previously to mix the magnetite with the oil, but the magnetite while wetted with water may be agitated together with the ore and the oil. I have also discovered that the addition of such carbonate in combination if desired with such silicate allows oxidized ores to be easily separated from their gangue by a so-called flotation process, although the recovery of the values need not necessarily take place by actual flotation.

Example IV: 50 lbs. of an oxid and carbonate of copper ore in a quartzite gangue, assaying 4.2% copper, were agitated with 1% of oil made up of 3 parts mineral residuum oil and 1 part cotton seed oil, together with 1 oz. soda ash and 2 lbs. silicate of soda in 54 lbs. water. This was then subjected to the ordinary hot acid water flotation process, an extraction of 75% copper being obtained without taking into account the copper dissolved.

What I claim is:—

1. In the treatment of an ore the process which consists in treating an oxidized ore with an oily liquid and water; aiding the oiling of the metalliferous contents of the ore by treatment with a carbonate of an alkaline metal and separating the oiled constituents from the unoiled constituents.

2. In the treatment of an ore the process which consists in treating an oxidized ore with an oily liquid and water and with a carbonate of an alkali metal in combination with the silicate of an alkali metal to aid the oiling of the metalliferous contents of the ore and separating the oiled constituents from the unoiled constituents.

3. In the treatment of an ore the process which consists in treating the ore with a magnetic substance, water, an oily liquid and with a carbonate of an alkali metal and magnetically separating the mixture.

4. In the treatment of an ore the process which consists in treating the ore with a magnetic substance, water, an oily liquid and with a carbonate of an alkali metal in combination with the silicate of an alkali metal and magnetically separating the mixture.

5. In the treatment of an ore the process which consists in treating the ore and magnetite by agitating them while mixed with water with an oily liquid in the presence of a carbonate of an alkali metal and magnetically separating the mixture.

ALFRED ARTHUR LOCKWOOD.

Witnesses:
WILFRED CARPMAEL,
HAROLD HARRY ANDERSON.